May 27, 1952 B. L. HAVENS 2,597,989
MECHANICAL ATTACHMENT FOR AZIMUTH OFFSET BOMBING
Filed Oct. 7, 1947 2 SHEETS—SHEET 2
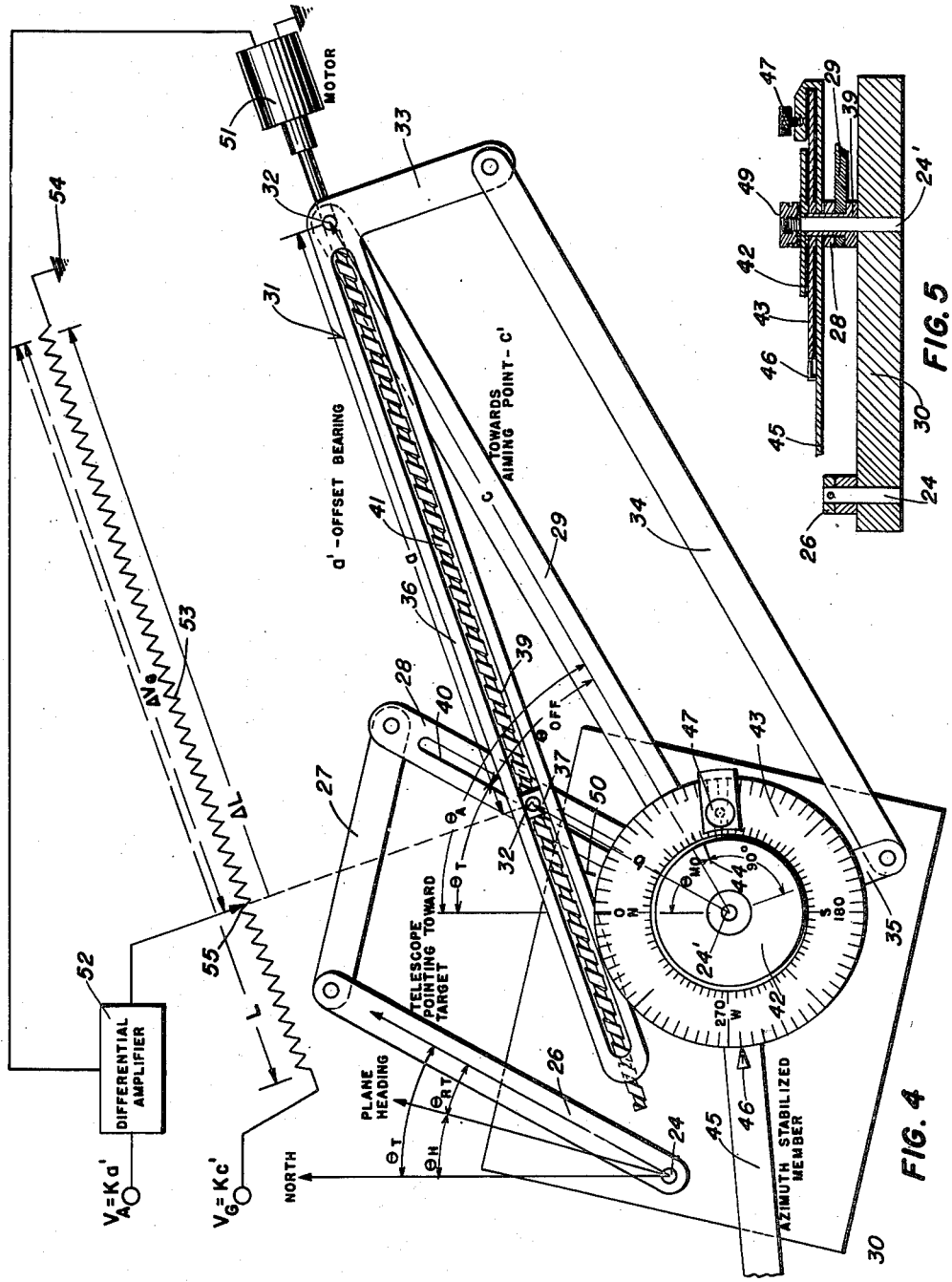
INVENTOR
BYRON L. HAVENS
BY
ATTORNEY Patented May 27, 1952

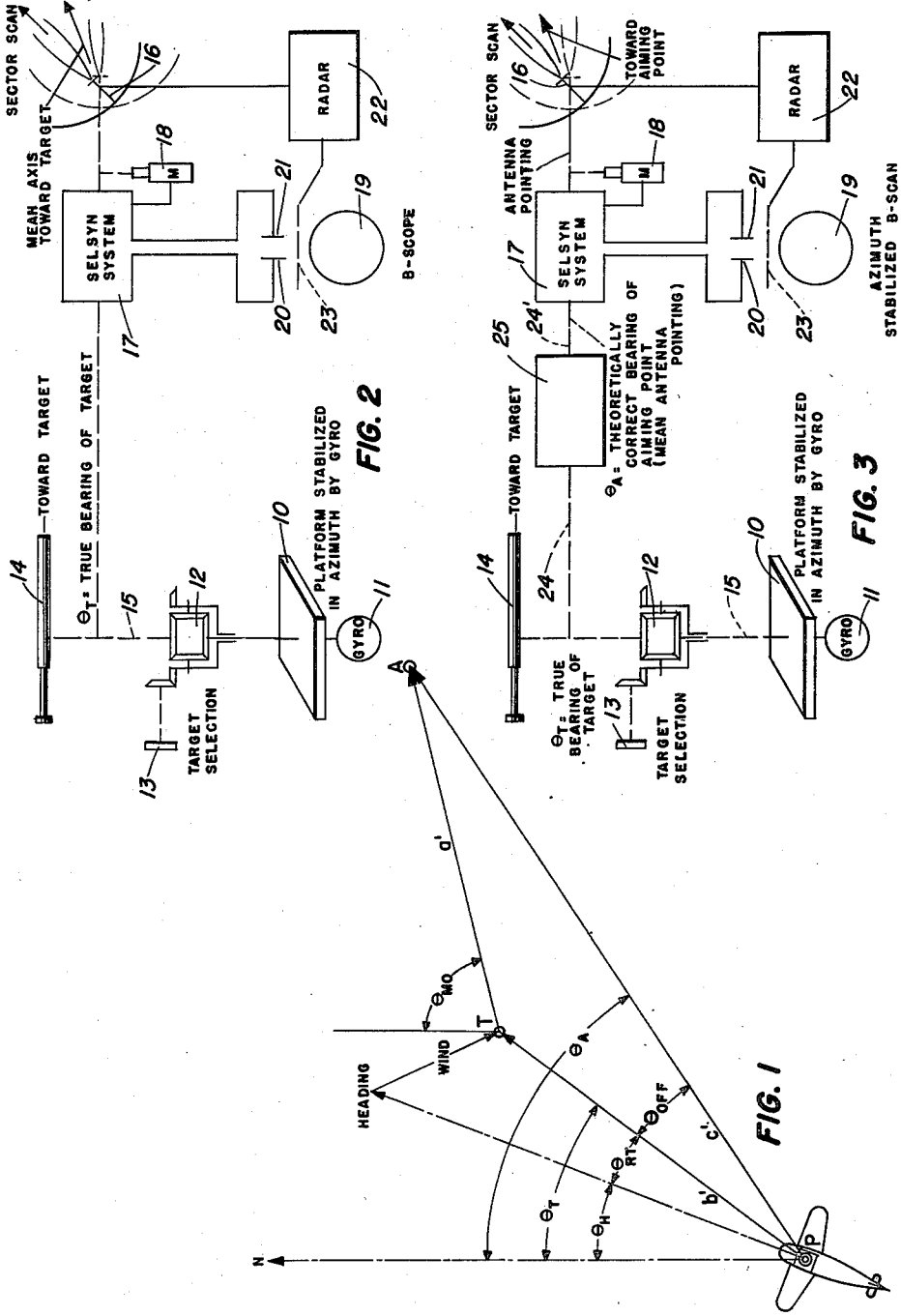

2,597,989

UNITED STATES PATENT OFFICE 2,597,989

MECHANICAL ATTACHMENT FOR AZIMUTH OFFSET BOMBING

Byron L. Havens, New York, N. Y., assignor, by mesne assignments, to the United States of America as represented by the Secretary of the Navy Application October 7, 1947, Serial No. 778,441

4 Claims. (Cl. 343—5)

This invention deals with bombing from aircraft and more particularly with the bombing of stationary ground targets by the use of the offset bombing technique.

Aircraft bombing equipment has been developed (cf. the copending application of Byron L. Havens et al., Serial No. 620,134, filed October 3, 1945, now abandoned) adapted chiefly for the blind bombing of surface vessels (or other targets) through use of search radar; i. e., radar incapable of supplying continuously the necessary information as regards the range and azimuth of the selected target. With the radar supplying this information and by supplying manually information pertaining to the bombing aircraft's air-speed and altitude, the proper release point is computed by the equipment and the aircraft is properly guided until it arrives at the computed release point. At this point, the bomb-release mechanism is energized automatically and the bomb is dropped.

The present invention involves a mechanical attachment for use in conjunction with the above referred to equipment, which attachment functions to permit azimuth offset bombing mainly for overland applications, and comprises essentially a triangular linkage adapted to be driven by a suitable motor to supply the continuously-changing angular azimuth offset. This angular offset, when continuously supplied to the equipment, permits the radar operator to track more easily an aiming point other than the target, from which a stronger radar echo may be obtained, while at the same time establishing a straight ground course toward the target.

The radar bombing system of the type described in the above-identified copending application is based upon the proposition that if one of two moving objects moves in such a manner that the true bearing of the second object as seen from the first remains unchanged, the two objects will arrive at the same point at the same time and are said to be on a collision course. The system operates to indicate to the pilot of the bombing aircraft the proper azimuthal position of the tracking point relative to a stable reference (gyro) so that the pilot may fly the aircraft in such a direction that the azimuth to the target does not change. It is proposed in this invention to track by radar an aiming point other than the target and it is a primary object to provide means for automatically and continuously adjusting the mean azimuthal position of the radar sector scan so that the pilot, by flying the aircraft to maintain no change in azimuth of the aiming point representation on the radar screen, will follow a collision ground course toward the target.

For a better understanding of the invention, together with other and further objects thereof, reference is had to the following description taken in connection with the accompanying drawing in which there is shown the preferred embodiment of the present invention, and in block and diagrammatic form the manner in which this invention is used with the radar bombing system of the above-identified copending application.

In the drawings:

Fig. 1 is a diagrammatic representation of the geometry of offset bombing;

Fig. 2 is a schematic representation of the azimuth section of the radar bombing system in which the present invention is to be used;

Fig. 3 is a schematic representation of the azimuth section of the radar bombing system employing the present invention;

Fig. 4 is a diagrammatic representation in plan of the present invention; and

Fig. 5 is an elevational view in cross-section of the construction shown in Fig. 4.

In order that the present invention and manner in which it is utilized may be more fully understood there is illustrated in Fig. 2 a schematic representation of the azimuth section of the radar bombing system of the above-cited copending application. It will be noted that this system employs a platform 10 and a telescope bomb sight 14 both stabilized in azimuth through the shaft 15 by means of the gyroscope indicated on the diagram at 11. Provision is made by means of the differential gearing 12 and the target selection knob 13 for altering the bearing of the telescope 14 relative to the gyro-stabilized azimuth indicated by platform 10. As will be noted the azimuth pointing of the telescope 14 determines the "cross hair bearing," which by limited definition is taken to mean the particular azimuth bearing at which the radar beam must be trained in order that the azimuthal position of the beam of the cathode ray tube may coincide with the stable azimuth indicated on its face. This stable azimuth may, for example, comprise a vertical line etched on the face of the screen and may be called the "azimuth cross hair."

As shown in the drawing, the telescope 14 and the antenna 16 are interconnected through a suitable synchro-device 17 referred to in the drawing as a selsyn system, which interconnection operates so that any angular change in the "cross hair bearing" of the telescope 14 introduced, for example, by means of the knob 13 and differential 12 will produce a like change in the mean azimuth or bearing of the antenna 16. A motor 18 is mechanically connected to antenna 16 and is adapted to rotate the antenna at a constant angular velocity in azimuth. This motor is shown connected electrically into the selsyn system and is provided for the purpose of causing the antenna 16 to scan a sector about a reference direction, i. e., the direction of the "cross hair bearing." The details of the selsyn system and the circuit for producing the motor energizing voltage, effective to produce the desired scanning action, are fully described in the copending application of John J. Lentz, Serial No. 616,379, filed September 14, 1945; and, since these details are unnecessary to an understanding of this invention they are not repeated here.

The azimuth scanning circuit, which is indicated generally at 17, also provides an azimuth sweep potential to the cathode ray tube 19 referred to hereafter as the B-scope. This feature of the system is illustrated diagrammatically in Fig. 2 by the two deflecting plates 20 and 21 shown connected electrically to the scanning circuit incorporated in the selsyn system. In this manner the circuit shown in block at 17 controls the sector scan as well as the azimuth deflection of the electron beam of the B-scope. The nature of the scanning circuit incorporated in the synchro-device is such that when the radar beam is pointed in the direction determined by the shaft 15 and the telescope 14, there is zero azimuth deflection on the B-scope; i. e., the beam of the B-scope is in the center of the screen on the "azimuth cross hair." The sector scan is approximately centered on the "cross hair bearing"; thus as an aid in visualizing the operation of the system it may be considered that when the knob 13 is turned the telescope and the mean axis of the scan are turned together so as to illuminate the target. The more accurate statement, however, is that the pointing of the telescope 14 corresponds to the "cross hair bearing" instead of the mean axis of scan, since the latter two may not exactly correspond.

In the drawing, Figs. 2 and 3, the return signals or echoes from the transmitting antenna are fed into the radar system indicated in block diagram 22 and are shown applied to the intensity grid 23 of the B-scope, so that the signals returned from a target located within the search sector will be portrayed as a bright spot on the screen of the B-scope 19. The sector scan may be selected by altering the azimuthal position of the telescope 14 and the antenna 16 until the desired target or tracking point appears in the center of the screen of the B-scope on the "azimuth cross hair." More complete details pertaining to the radar system disclosed herein by the block diagram 22, including the electrical generation of the tracking pip coincident with the target echo and the generation of a calculated release pip, may be had by reference to the copending application Serial No. 620,134.

Referring now to Fig. 1 of the drawing, there is shown the azimuth offset geometry. It will be seen that with this system the approach to the target line P—T will be a straight ground track toward the target. If the bombing plane P moves from its present position P to a new position along the path P—T, the true bearing of the target $\theta_T$ does not change; however, the bearing of the aiming or tracking point $\theta_A$ ($\angle$NPA) does change continuously.

It is an object in the bombing system herein discussed to present an azimuth indication of the aiming point on the radar screen to apply an offset angle to the train of the radar antenna whereby the bombing aircraft may be maneuvered so that this aiming point indication will not drift in azimuth and the bombing aircraft will follow a straight line approach to the target as indicated by the line P—T. With the radar directed toward the point A, selected because it is capable of producing a good radar echo, this point appears as a bright spot on the radar screen. To maintain this point on the "azimuth cross hair," and for the bombing plane to follow a straight line course to the target, it is necessary continuously to adjust the train of the radar antenna 16 so that its center of scan will differ from the bearing of the target by an amount equal to the offset angle $\theta_{off}$.

As observed from Fig. 1 that as the bombing plane progresses along the P—T, there will be at each instant a theoretically correct bearing for point A, indicated on the drawing as $\theta_A$. Since $\theta_T$ is constant the variable portion of $\theta_A$ is the offset angle $\theta_{off}$. The present invention comprises means for continuously adjusting the "cross hair bearing" for point A that involves the generating of an angle equal to $\theta_{off}$ and the adding of this angle to the azimuth stabilized bearing of the telescope 14, for example. With this angle added to the bearing of the line of sight to the target (PT) the mean axis of scan of the radar antenna (PA) will be such that point A will be observed on the radar screen along the "azimuth cross hair." If the bombing plane follows a course indicated by P—T this representation of point A on the radar screen will not move in azimuth; however, should it appear to drift off the "azimuth cross hair" the heading of the plane is changed until the desired conditions are again maintained.

Referring now to Fig. 3 in the drawing, there is shown diagrammatically a method for applying this offset angle to the radar bombing system illustrated in Fig. 2. It is noted that the block 25 has been added, including input and output shafts indicated diagrammatically by the lines 24—24' respectively. This block 25 and corresponding input and output shafts represent the apparatus shown in detail in Figs. 4 and 5.

This apparatus comprises a pantograph formed of a frame 30 and links 26, 27 and 28. Link 26 is driven by shaft 24, which shaft is in turn driven by shaft 15 of Fig. 2. Accordingly the angular position of the links 26 and 28 corresponds to the angle $\theta_T$ of Fig. 1 and represent the true bearing of the target. The link 28 is rotatably supported on the shaft 24', which shaft serves as a means for transmitting the output of the pantograph linkage apparatus to the antenna through the selsyn system 17 by being secured for rotation with the link 29, which link must therefore form an angle with the link 28 equal to the angle $\theta_{off}$. Accordingly, the position of the link 29 corresponds with the line PA of Fig. 1 and points toward the tracking or aiming object. The link 29 is positioned by the right angle bell crank lever 31, which lever is shown pivoted at 32 so that its short arm 33 forms a second pantograph or parallelogram with the links 29, 34 and 35. The long arm 36 of the bell crank 31 is slotted at 39 to receive the sliding block 37, which block is also secured by means of a pin 38 to a slide (not shown) that is positioned for travel in the slot 40 of the link 28. The block 37 is threaded upon a worm shaft 41 and is positionable within the slot 39 by rotation of the shaft 41.

As shown more clearly in Fig. 5 a pair of concentric discs 42 and 43 are mounted for rotation about the output shaft 24'. The outermost disc 43 is shown provided with a pair of radial graduations about its inner and outer circumference whereas the inner disc 42 is provided with an index mark 44 adapted for cooperation with the innermost set of graduations. There is also pivoted about the shaft 24' an azimuthal gyrostabilized link 45 which carries an index 46. This link may be clamped to the disc 43 to connect the disc also to the azimuth stabilized member by means of the set screw 47.

There is indicated on Fig. 4 a triangle formed of sides $a$, $b$ and $c$. The side $a$ of this triangle corresponds to that portion of the long arm 36 of the bell crank lever 31 that lies between the center of the pivot 32 and the center of the pin 38, side $b$ corresponds with that portion of the link 28 which lies between the center of the shaft 24' and the center of the pin 38, and side $c$ corresponds with the link 29 between its pivots located at the centers of shafts 24' and 32. In order that the angle between links 28—29 (sides $b$ and $c$) may be made equal to the offset angle $\theta_{off}$ of Fig. 1 the triangle $abc$ must be similar to triangle PTA ($a'b'c'$) of Fig. 1.

The following conditions establish similarity of these two triangles:

$a$ is parallel to $a'$ (TA)     1
$a/c = a'/c'$ (TA/PA)     2
$c$ is parallel to $c'$ (PA)     3

The above conditions are fulfilled in the following manner:

Before the bombing mission the particular target (T) is selected as well as the tracking or aiming point A. Accordingly, the true bearing of the aiming point from the target $\theta_{MO}$ is known. The inner disc 42 is clamped by means of the knurled knob 49 to the outer disc 43 so that, as shown in Fig. 4, the reference mark 44 on the inner disc will be set at an indication on the inner graduations of the outer disc corresponding to the angle $\theta_{MO}$. As an inspection of Fig. 4 will reveal, this reference mark always points in a direction parallel to the long arm 36 of the bell crank lever 31. This is achieved because the inner disc and arm 35 are attached so that the reference mark on the inner disc is perpendicular to the link 35; furthermore, the link 35 is parallel to the short arm of the bell crank 33 which is rigidly attached at an angle of 90° to the long arm 36. When the bombing plane is in flight the inner and outer discs, now clamped together along with the links 29, 33, 34 and 35, are positioned by the operator by movement of the target selection knob 13, for example, so that the reference mark 50 on the frame 30 will be positioned opposite the calibration mark on the outer disc which corresponds to the compass heading of the bombing aircraft. The zero calibration on the outer disc 43 will now point to the true north. The outer disc 43 is now clutched to the link 45 by means of the set screw 47 so that the outer disc also becomes stabilized in azimuth about the axis of shaft 24'. The zero mark on this disc will then maintain a true northerly bearing with respect to the aircraft. The reference mark 44 on the inner disc 42 having previously been set at an angle equal to $\theta_{MO}$ will correspond to the true bearing of the aiming point from the target.

Since the arm 36 is parallel to the reference mark 44 of disc 42 the condition (1), e. g., that the side $a$ of the triangle of Fig. 5 is parallel to side $a'$ of the triangle of Fig. 1, is established.

Referring now to condition (2) above, e. g., that the ratio of sides $a$—$c$ of the triangle of Fig. 4 is equal to the ratio of sides $a'$—$c'$ of the triangle of Fig. 1; as previously described the block 38 is adapted to be driven by the worm gear 41 and is secured to the slide engaging the link 28 by means of a pin 38. This worm shaft 41 is adapted for operation to maintain the side $a$ of the triangle $abc$ of Fig. 4 at such length that condition (2) is fulfilled. Although this could be done manually by rotating the worm shaft 41 with a suitable mechanical connection, means is provided for achieving this condition automatically. This means comprises the motor 51 and its respective energizing circuit. This motor 51 receives its energizing voltage from the output of the differential amplifier 52. This amplifier circuit is such that its output is proportional or otherwise functionally related to the difference in magnitude of two voltage inputs $V_A$ and $\Delta V_G$, where $\Delta V_G$ is the voltage drop obtained from the potentiometer (Fig. 4) across the portion thereof between the ground end 54 and the slide wire 55. The voltage $V_A$ supplied to the differential amplifier is made proportional to the offset ground range of the aiming point A, i. e., TA of triangle 1. Since $V_A$ is proportional to TA it is also proportional to side $a'$ of the triangle $a'b'c'$ of Fig. 1. Inasmuch as this ground range of the aiming point from the target is known prior to the bombing mission the proportionality factor K may be determined so that $$V_A = Ka' \qquad 4$$

The voltage $V_G$ which also supplies the differential amplifier is derived from the potentiometer 53 which is mechanically attached to the arm 36 of the bell crank lever 31. Moreover the slide wire 55 is mechanically attached to the movable block 38 so that the point of contact of the slide wire 55 with the potentiometer 53 will coincide with the center of the pin 38; and the effective length L of the potentiometer is made equal to the length of the link 29 beween its pivots so that it is equal to the side $c$ of the triangle $abc$ of Fig. 4. Also the voltage applied across the potentiometer 53 is made proportional by the same proportionality K of Equation 4 to the ground range of the aiming point, side $c'$ of the triangle $a'b'c'$ of Fig. 1. Accordingly:

$$V_G = Kc' \qquad 5$$

The voltage $V_G$ is derived by circuit means illustrated and described in the copending application of Havens and Lentz, S. N. 620,135, filed October 3, 1945, which circuit details are omitted here in the interest of clarity. The voltage $\Delta V_G$ is applied to the differential amplifier by connecting the slide wire 55 to its input terminal so that the voltage $\Delta V_G$ is dependent upon the portion of the slide wire 55 relative to the length L of the potentiometer. Inasmuch as the slide wire is mechanically coupled to the block 38 and moves with the block, the distance $\Delta L$ corresponding to $\Delta V_G$ will be equal to $a'$ of the triangle $a'b'c'$ of Fig. 4. This slide wire will be moved along the potentiometer by the motor to a position of rest wherein $$V_A = \Delta V_G \qquad 6$$

At this position $\Delta L$ will equal $a$ and since $V_A$ is equal to $Ka'$ $$\Delta V_G = Ka' \qquad 7$$

Since $\Delta V_G$ is proportional to $a'$ and $V_G$ is proportional to $c'$ $$\Delta V_G/V_G = a'/c' \qquad 8$$

And further since the voltage drop along the potentiometer is uniform, this voltage drop can be expressed in terms of length of the potentiometer thus:

$$\Delta L/L = a'/c' \qquad 9$$

but $L$ is made equal to $c$ and $\Delta L$ is equal to $a$, accordingly:

$$a/c = a'/c' \qquad 10$$

Condition (3) above is fulfilled by the act of piloting the bombing aircraft P. This results from the fact that the bombing aircraft is headed so that the aiming point as viewed on the screen of the B-scope coincides with the "azimuth cross hair." The fact that condition (3) is thereby fulfilled may be seen from the following considerations:

(a) Because of the coincidence of the aiming point A with the "azimuth cross hair" on the screen, the aiming point bearing must correspond with the "cross hair bearing."

(b) Side $c'$ of Fig. 1 lies in the direction of the aiming point bearing.

(c) Side $c$ of Fig. 4 is rigidly linked to shaft 24', the position of which determines the "cross hair bearing."

(d) Hence from a, b and c above, side $c$ must be parallel to side $c'$ thereby fulfilling condition 3.

Thus the apparatus illustrated in Figs. 4 and 5, when applied to the apparatus shown in Fig. 3, will operate to introduce an offset angle $\theta_{off}$ between shafts 24 and 24'. If the heading of the bombing plane is readjusted until the aiming point appears under the "azimuth cross hair," the shaft 24' will thus position the link 29 so that it corresponds to the actual aiming point bearing at a particular instant. Since the action of the linkage of Fig. 4 is such that the position of the link 26 and its shaft 24 differ in angular position from link 29 and its corresponding shaft 24' by an angle equal to $\theta_{off}$.

The telescope 14 has been included in the description of the drawing to represent the optical portion of the bomb sight and is representative of the line of sight to the target. Since the telescope 14 is positioned by the shaft 24 to point at all times directly toward the target, the bombing run, although initiated by means of radar, may be completed optically at any time there is a break in the overcast or that the target is otherwise visible.

It is clear that various modifications in construction and arrangements of parts may be made without departure from the spirit and scope of the present invention and the invention is not therefore limited by the illustration of the specific preferred example or otherwise than by the appended set of claims.

I claim:

1. In a bombing system for maintaining a collision course between a moving aircraft and a stationary target by tracking a stationary aiming point, the combination of a member stabilized in azimuth about a predetermined axis, a first pantograph comprising a plurality of links pivoted at spaced companion points in parallelogram form, relatively adjustable means coupling said pantograph to said member at one of said points whereby said pantograph may be stabilized in azimuth at a position adjustable relative to said member, an output shaft, a second pantograph coupled to said output shaft at the other companion point for said first pantograph, an arm of adjustable length coupling adjacent links of said first and second pantographs, electrical drive means for adjusting the length of said arm, and circuit means for energizing said electrical drive means to maintain said arm at a length whereby the ratio of the length of said arm to the length of the said adjacent link of said second pantograph is equal to the ratio of the distance of said aiming point from said target to the distance of the tracking point from said target.

2. A bombing system for maintaining a collision course between a moving aircraft and stationary target by tracking with radar a stationary aiming point having a known range and bearing from said target, a first and second shaft rotatable on said aircraft and manually adjustable with respect thereto, an azimuth stabilized member adjustably coupled to said first shaft, a radar antenna positioned in azimuth relative to said aircraft by said second shaft to a mean axis of scan for tracking said aiming point, a linkage mechanism including an azimuth stabilized member having a reference mark for indicating the true heading of said aircraft interconnecting said first and second shafts to alter the relative angular position thereof, means for setting said linkage mechanism whereby the bearing of a link thereof relative to said reference mark of said azimuth stabilized member equals the true bearing of said aiming point from said target, means adjusting said first shaft relative to said member whereby the difference in angular position of said shafts is equal to the difference in bearing of said target and tracking point from said aircraft, and means responsive to the change in ground range of said aircraft from said tracking point for altering the angular position of said link relative to said member to maintain the bearing of said link equal to the difference in bearing of said target and tracking point whereby said mean axis of scan will be maintained in the direction of said tracking point and said aircraft will follow a collision course toward said target.

3. The combination defined in claim 1 above wherein said circuit means comprises a differential amplifier the output of which is a function of the difference in magnitude of two voltage inputs, means for applying to said amplifier a first voltage input proportional to the ground range from said target to said tracking point, a potentiometer mounted on said adjustable arm having a length equal to the length of said adjacent link of said second pantograph and a voltage drop throughout said length proportional to the ground range from said target to said tracking point, a contact for said potentiometer secured to the end of said arm at its point of connection with said adjacent link of said first pantograph and movable with the end of said arm as its length changes, circuit connections from said movable contact for applying a second voltage to said amplifier proportional to the length of said arm whereby the output voltage of said amplifier will be zero when the movable contact is positioned to make the length of said arm proportional to the ground range from said target to said tracking point.

4. In a bombing system for maintaining a collision course between a moving aircraft and a stationary target by tracking with radar a stationary aiming point, comprising a radar antenna, means on said aircraft for establishing and maintaining a line of sight to said target irrespective of the heading of said aircraft, means for generating an angle equal to the difference in bearing from said aircraft to said target and aiming point, and means for adding an angle equal to this difference in bearing to the angle between the heading of said aircraft and line of sight for establishing a mean axis of scan for said antenna.

BYRON L. HAVENS.

REFERENCES CITED

The following references are of record in the file of this patent:

UNITED STATES PATENTS

| Number | Name | Date |
|---|---|---|
| 2,414,108 | Knowles | Jan. 14, 1947 |
| 2,438,112 | Darlington | Mar. 23, 1948 |